US005697539A

United States Patent [19]

Furuya

[11] Patent Number: 5,697,539

[45] Date of Patent: Dec. 16, 1997

[54] LABEL OR TAG SHEET FEEDING APPARATUS WITH FAILURE DETECTION

[75] Inventor: Kazutoshi Furuya, Mishima, Japan

[73] Assignee: Kabushiki Kaisha TEC, Shizuoka, Japan

[21] Appl. No.: 532,803

[22] PCT Filed: Mar. 17, 1995

[86] PCT No.: PCT/JP95/00459

§ 371 Date: Nov. 9, 1995

§ 102(e) Date: Nov. 9, 1995

[87] PCT Pub. No.: WO95/25058

PCT Pub. Date: Sep. 21, 1995

[30] Foreign Application Priority Data

Mar. 17, 1994 [JP] Japan .................................... 6-046657

[51] Int. Cl.$^6$ ............................ B23Q 15/00; B23Q 16/00

[52] U.S. Cl. ................................. 226/11; 226/45; 226/48

[58] Field of Search ................................. 226/10, 11, 45, 226/109, 110, 4, 48

[56] References Cited

U.S. PATENT DOCUMENTS

| | | | |
|---|---|---|---|
| 3,317,734 | 5/1967 | Martin, Jr. | 226/11 |
| 3,949,856 | 4/1976 | Ulber et al. | 226/11 |
| 4,276,547 | 6/1981 | Bowen et al. | 226/10 |
| 4,639,152 | 1/1987 | Yamamoto et al. | 226/45 |
| 5,335,837 | 8/1994 | Saeki et al. | 226/110 |

FOREIGN PATENT DOCUMENTS

| | | | |
|---|---|---|---|
| 59-64466 | 4/1984 | Japan | 226/11 |
| 59-64467 | 4/1984 | Japan | 226/11 |
| 62-31655 | 2/1987 | Japan | 226/45 |
| 0314224 | 12/1971 | U.S.S.R. | 226/11 |

OTHER PUBLICATIONS

IBM Technical Disclosure Bulletin, vol. 20, No. 11A, Apr. 1978, pp. 4266–4269, "side–of–forms, end–of–forms, and forms jam–. . . ".

*Primary Examiner*—Daniel P. Stodola
*Assistant Examiner*—Matthew A. Kaness
*Attorney, Agent, or Firm*—Oblon, Spivak, McClelland, Maier & Neustadt, P.C.

[57] ABSTRACT

A transmission type optical sensor, which is disposed in a position facing a label sheet fed by a sheet feeding mechanism. It detects the position of a label according to the output value of the same, and a reflection type optical sensor, which is disposed in a position facing a tag sheet fed by the sheet feeding mechanism detects the position of a tag according to the output value of the same. The apparatus, when the detection timing of the label or the tag deviates from a predetermined tolerance, detects a sheet failure, and at this time, it (when a label sheet is fed) determines whether the output value of the reflection type optical sensor provided as the sensor for detecting the position of the tag is high or low, or (when a tag sheet is fed) determines whether the output value of the transmission type optical sensor provided as the sensor for detecting the position of the label is high or low. When the output value of the reflection type optical sensor is low, the label sheet is determined to be terminated, or when the output value of the transmission type optical sensor is high, the tag sheet is determined to be terminated. Thus, a failure in the sheet and a termination of the sheet can be detected clearly distinguished from each other.

17 Claims, 5 Drawing Sheets

FIG. 5(A)

| OBJECT | OUTPUT OF TRANSMISSION TYPE OPTICAL SENSOR (XMSN OPT SNSR) |
|---|---|
| BACKING PAPER | HIGH |
| | (THRESHOLD VALUE) |
| LABEL | LOW |
| TAG SHEET | LOW |
| NONE | HIGH |

FIG. 5(B)

| OBJECT | OUTPUT OF REFLECTION TYPE OPTICAL SENSOR (REFL OPT SNSR) |
|---|---|
| MARK ON TAG SHEET | LOW |
| | (THRESHOLD VALUE) |
| OTHER THAN MARK | HIGH |
| LABEL SHEET | HIGH |
| NONE | LOW |

LABEL OR TAG SHEET FEEDING APPARATUS WITH FAILURE DETECTION

TECHNICAL FIELD

The present invention relates to a sheet feeding apparatus used in a printer to print labels, tags, and the like for feeding a label sheet or a tag sheet.

BACKGROUND ART

A sheet feeding apparatus used in a label printer and the like feeds a label sheet or a tag sheet continuously by means of a sheet feeding mechanism constructed of a pulse motor, a feed roller, and the like. Generally, a label sheet is formed of backing paper constituted of a continuous sheet of paper with a number of labels removably stuck on the surface thereof at regular intervals and a tag sheet is formed of tags, which are serially joined with each other through a perforation, with markings individually formed on the surface thereof at regular intervals. In the printing of images on labels or tags through the use of such a label printer, it becomes necessary to detect the positions of the labels on the label sheet or the tags on the tag sheet continuously fed forward by the sheet feeding mechanism. Accordingly, there has been practiced to detect the positions of the labels by disposing a transmission type optical sensor in the sheet feeding mechanism or to detect the positions of the tags by disposing a reflection type optical sensor in the sheet feeding mechanism. Namely, the output power of the transmission type optical sensor becomes high at the position of the label placed on the label sheet and becomes low at the position of the backing paper. On the other hand, the output power of the reflection type optical sensor becomes low at the position of the marking and becomes high at the position of the space between the markings. Therefore, the position of the label or the position of the tag can be detected on the basis of the output of each optical sensor. More specifically, on the basis of various conditions such as transmission factor of the backing paper of the label sheet or the reflection factor of the tag sheet, a threshold value is set and the position of the label or the tag is detected by comparing the output of each optical sensor with the threshold value.

When, however, a failure in the feeding of the label sheet or tag sheet such as jamming of the sheet or peeling off of the label occurs, the detection timing of the label or the marking by each optical sensor shifts backward or forward and it becomes impossible to correctly detect the label or the tag. In order to avoid such a difficulty, there has been used such means as to provide a predetermined tolerance for the detection timing of each optical sensor. More specifically, as the factor to determine the right detection timing of each optical sensor, the label interval or the marking interval has been set to about 0.5 to 1.5 times as large as the right timing in the normal feeding and a failure in the feeding of the label sheet or the tag sheet or a failure of the sheet itself has been determined to have occurred when the detection timing by the optical sensor of the label or the marking deviated from the tolerance. Typically, a jam can be mentioned as a failure in the sheet feeding and unexpected peeling of a label off the label sheet and the like can be mentioned as a failure of the sheet itself. Thus, the position of the label on a label sheet and occurrence of a failure of it can be detected by the output power of the transmission type optical sensor and the position of the tag of the tag sheet and a failure of it can be detected by the output value of the reflection type optical sensor. When a failure of the label sheet or the tag sheet is detected, such a process is taken to stop the sheet feeding operation by the sheet feeding mechanism or indicates occurrence of a failure by sounding a buzzer or lighting a pilot lamp.

A problem with such means of conventional art will be described below. In the feeding of a label sheet, the output power level of the transparent type optical sensor remains high when the label sheet reaches its end. In the feeding of a tag sheet, the output power level of the reflection type optical sensor remains low when the tag sheet reaches its end. In such case, the output value of each of the optical sensors remaining in such a constant state easily exceeds the detection timing of each optical sensor. Therefore, there arises a problem that an end of a sheet cannot be distinguished from a failure in the sheet feeding. Accordingly, when a type of apparatus which indicates occurrence of a failure in the sheet feeding by sounding a buzzer or lighting a pilot lamp is used, an erroneous indication is given that a failure has occurred in spite of the fact that the sheet has come to its end and, thereby, the operator is confused.

A first object of the invention is to provide a sheet feeding apparatus which can detect a failure in the sheet and an end of the sheet distinguished from each other.

A second object of the invention is to provide a sheet feeding apparatus capable of achieving the first object by using an existing apparatus.

A third object of the invention is to provide a sheet feeding apparatus capable of achieving the first object more reliably.

DISCLOSURE OF INVENTION

The present invention includes a sheet feeding mechanism having either a label sheet or a tag sheet selectively set thereon and feeding the set sheet along a predetermined path, an element for detecting a label on the label sheet fed by the sheet feeding mechanism according to the output value of a transmission type optical sensor, which becomes high at the position of the backing paper and becomes low at the position of the label, an element for detecting a tag of the tag sheet fed by the sheet feeding mechanism according to the output value of a reflection type optical sensor, which becomes low at the position of the marking and becomes high at the position of the space between the markings, an element for detecting a sheet failure when the detection timing of the label or the tag deviates from a predetermined tolerance, an element for determining, when a sheet failure is detected, whether the output value, depending on the kind of the sheet set on the sheet feeding mechanism, either the reflection type optical sensor (when a tag sheet is set on the sheet feeding mechanism) or the transmission type optical sensor (when a label sheet is set on the sheet feeding mechanism) is high or low, and an element for detecting a termination of the sheet when the output value of the reflection type optical sensor is detected to be low (with the tag sheet) or when the output value of the transmission type optical sensor is detected to be high (with the label sheet).

The present invention, according to another aspect, includes a sheet feeding mechanism having either a label sheet or a tag sheet selectively set thereon and feeding the set sheet along a predetermined path, an element for detecting a label on the label sheet fed by the sheet feeding mechanism according to the output value of a transmission type optical sensor, which becomes high at the position of the backing paper and becomes low at the position of the label, an element for detecting a tag of the tag sheet fed by the sheet feeding mechanism according to the output value of a reflection type optical sensor, which becomes low at the position of the marking and becomes high at the position of the space between the markings, an element for detecting a sheet failure when the detection timing of the label or the tag deviates from a predetermined tolerance, an element for determining, when a sheet failure is detected, whether the output value of the reflection type optical sensor or the transmission type optical sensor is high or low, and an element for detecting a termination of the sheet when the output value of the reflection type optical sensor is detected to be low and the output value of the transmission type optical sensor is detected to be high.

Accordingly, in the present invention, a failure in the sheet and a termination of the sheet can be detected clearly distinguished from each other.

BRIEF DESCRIPTION OF THE DRAWINGS

FIG. 5(A) is a table showing output values of a transmission type optical sensor when facing the backing paper of a label sheet, the label on the label sheet, and a tag sheet, and when neither the label sheet nor the tag sheet is set in the feed path of the sheet; and FIG. 5(B) is a table showing output values of a reflection type optical sensor when facing the marking on a tag sheet, other portion than the marking on the tag sheet, and a label sheet, and when neither the label sheet nor the tag sheet is set in the feed path of the sheet.

BEST MODE FOR CARRYING OUT THE INVENTION

Figure 1:
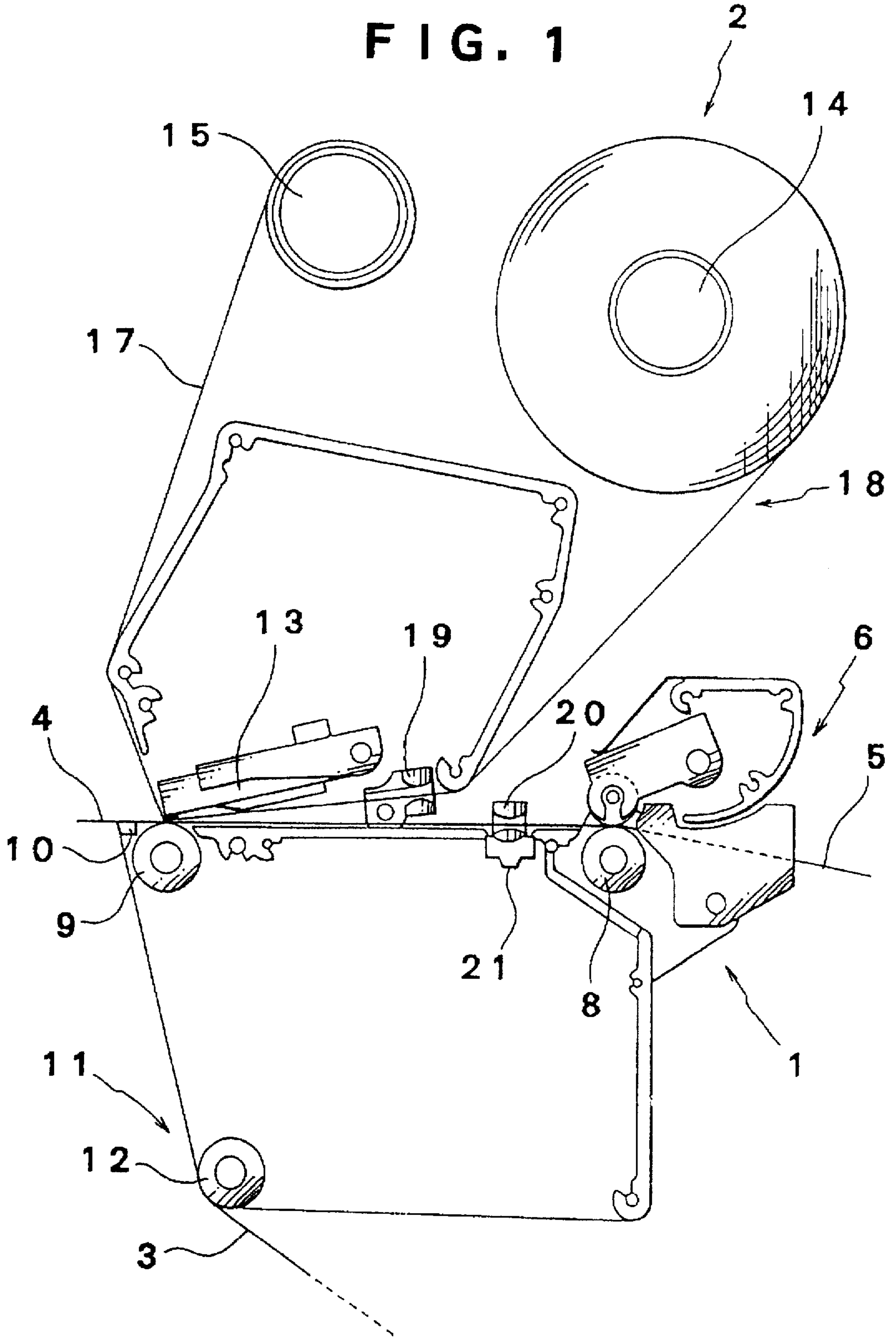
FIG. 1 is a longitudinal sectional view showing an internal structure of a label printer including a sheet feeding apparatus as an embodiment of the invention.

An embodiment of the invention will be described below with reference to the accompanying drawings. The embodiment shows an example of a sheet feeding apparatus 1 as a portion of a label printer 2. As shown in FIG. 1, the sheet feeding apparatus 1 includes a sheet feeding mechanism 6 formed of a feed roller 8 and a platen roller 9, driven by a stepping motor 7, and the like. The sheet feeding mechanism 6 allows either a label sheet 5, which is formed of backing paper 3 constituted of a continuous sheet of paper with a number of labels 4 removably stuck on the surface thereof at regular intervals, or a tag sheet (not shown), which is constituted of a continuous sheet of paper having tags serially connected with each other and individually provided with markings of printed black marks formed thereon, to be selectively set thereon. Downstream of the platen roller 9, there is provided a peeling member 10 for peeling off the front half of the label 4 by bending the backing paper 3 of the label sheet 5 into a sharp angle. Below the platen roller 9, there is provided a backing paper take-up mechanism 11 for taking up the backing paper 3 with the label 4 peeled off the same. The backing paper take-up mechanism 11 is constructed of a guide roller 12 and a take-up roller (not shown), driven by a DC motor (not shown), and the like.

As the printing head for performing printing on a label 4 or a tag, a thermal head 13 is used. The thermal head 13 is removably pressed on the platen roller 9 across a path for feeding the label sheet 5 or the tag sheet. An ink ribbon 17 is also guided between the platen roller 9 and the thermal head 13. The ink ribbon 17 is continuously fed by a ribbon feeding mechanism 18 and passed through the space between the thermal head 13 and the platen roller 9 in a state pressed to the label sheet 5 or the tag sheet. The ribbon feeding mechanism 18 is constructed of a support roller 14 for supporting the ink ribbon 17 in a roll form wound around it, a take-up roller 15 for taking up the ink ribbon 17 driven by a stepping motor 16, and the like.

The label printer 2 has a single transmission type optical sensor 19 and a set of a transmission type optical sensor 20 and a reflection type optical sensor 21. The transmission type optical sensor 19 is disposed in a position to detect the ink ribbon 17 at the rear of the thermal head 13. The transmission type optical sensor 20 and the reflection type optical sensor 21 are disposed in a position to detect the label 4 stuck on the label sheet 5 or the marking formed on the tag sheet at the rear of the thermal head 13.

Figure 2:
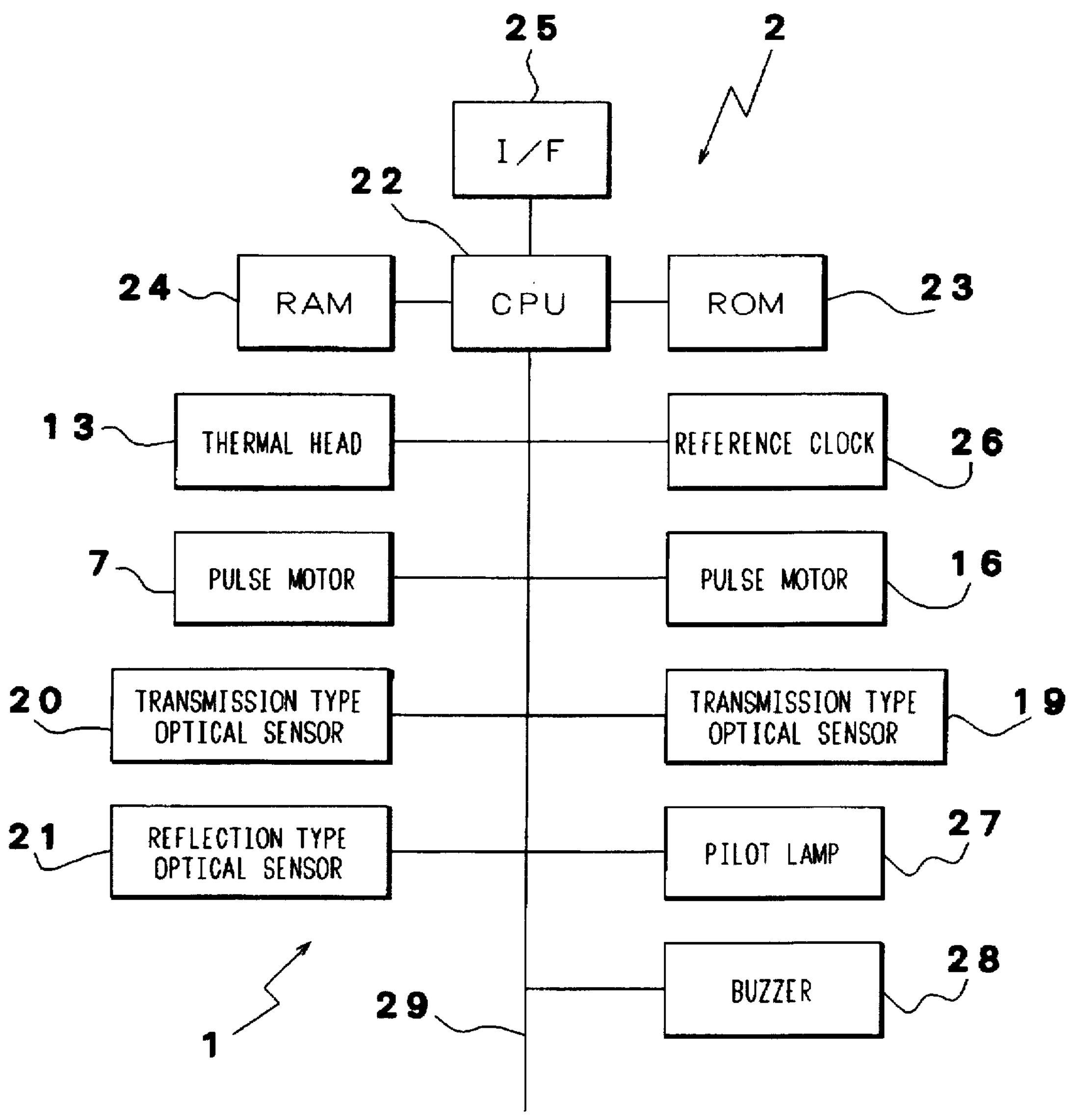
FIG. 2 is a block diagram showing electrical connections between various blocks of the label printer.

FIG. 2 is a block diagram showing electrical connections between various blocks of the label printer 2. There is provided a CPU 22 for executing various data processing. The CPU 22 is connected, by a system bus 29, with a ROM (Read Only Memory) 23 in which various data such as control programs are fixedly stored in advance, a RAM (Random Access Memory) 24 in which various data such as printing data are temporarily stored so as to be updated when necessary, an I/F (interface) 25 for receiving printing data from a host computer (not shown), a reference clock 26 for constantly outputting a clock pulse, the thermal head 13, the stepping motors 7 and 16, the optical sensors 19–21, a pilot lamp 27 for giving an alarm by flashing, a buzzer 28 for giving an alarm by sounding, and the like. Though it is not shown, the above described DC motor for driving the guide roller 12 and the take-up roller is also connected to the CPU 22 by the system bus 29.

In the storage area of the RAM 24, there is provided a flag region, not shown. In the flag region, there are provided a setting region of a failure flag indicating occurrence of a failure in the feeding of the label sheet 5 or the tag sheet and a setting region of a termination flag indicating that the label sheet 5 or the tag sheet has come to its end.

In the storage area of the RAM 24, there are also stored various set values. The set values in the storage area of the RAM 24 include for example various threshold values for the optical sensors 19, 20, and 21, the number of steps of the stepping motor 7 required for feeding a piece of the label 4 on the label sheet 5 or a piece of the tag of the tag sheet, and the tolerances of the timing for detecting the label 4 and the tag. The threshold value for the transmission type optical sensor 20 is set, as shown in FIG. 5(A), such that the output value of the transmission type optical sensor 20 becomes high at the portion of the backing paper 3 of the label sheet 5 and becomes low at the portion of the label 4. Accordingly, when a tag sheet is detected by the transmission type optical sensor 20, its output value becomes low. The threshold value for the reflection type optical sensor 21 is set, as shown in FIG. 5(B), such that the output value of the reflection type optical sensor 21 becomes low at the portion of the marking on the tag sheet and it becomes high at the portion other than the marking. Accordingly, when a label sheet is detected by the reflection type optical sensor 21, its output value becomes high. The value of tolerance of the timing for detecting a label 4 is set to 0.5–1.5 times as large as the number of steps of the stepping motor 7 required for feeding one piece of the label 4. The value of tolerance of the timing for detecting a tag is set to 0.5–1.5 times as large as the number of steps of the stepping motor 7 required for feeding one piece of the tag. Here, the lengths of the label and the tag are not constant. Data about the lengths can be set by command from the host computer.

The CPU 22 performs various functions in accordance with control programs stored in the ROM 23. As the means for performing these various functions, there are provided label position detection means, tag position detection means, label failure detection means, tag failure detection means, label feed ending means, tag feed ending means, label failure determination means, label failure confirmation means, label end detection means, tag failure determination means, tag failure confirmation means, and tag end detection means. The function of each means will be described below.

Figure 3:
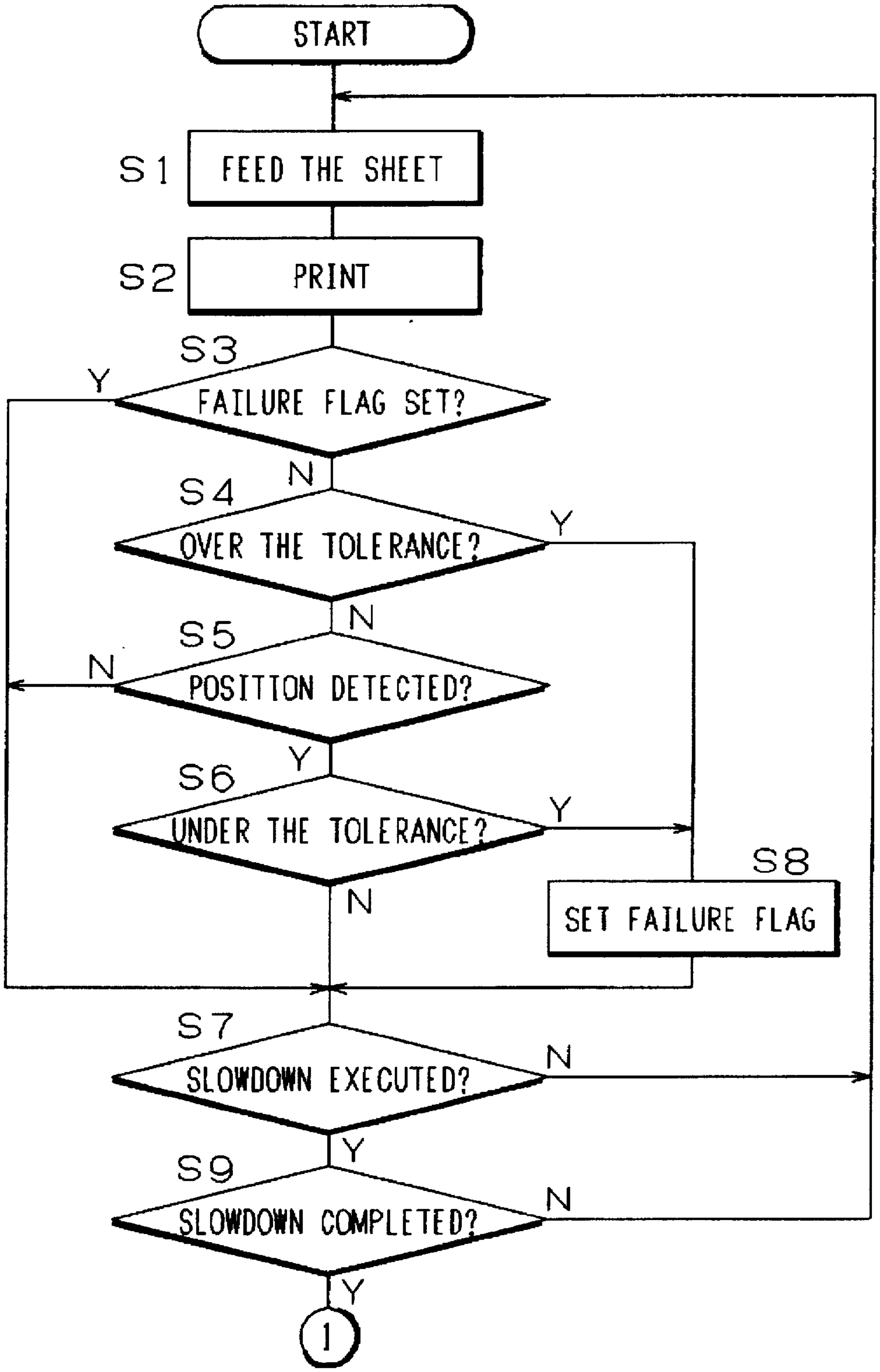
FIG. 3 is a flowchart showing processes performed in the label printer.

The label position detection means is a means for detecting the position of the label 4 on a label sheet 5 making use of the fact that the output value of the transmission type optical sensor 20 is higher than its threshold value at the position of the backing paper 3 and lower than the same at the position of the label 4 (refer to FIG. 3, step S5). The tag position detection means is a means for detecting the position of the tag of a tag sheet by making use of the fact that the output value of the reflection type optical sensor 21 is higher than its threshold value at the position of the marking and lower than the same at the position other than the marking (refer to FIG. 3, step S5).

The label failure detection means is a means for detecting the detection timing of the label 4 deviating from the tolerance stored in the RAM 28 (refer to FIG. 3, steps S4 and S6). The tag failure detection means is a means for detecting the detection timing of the tag deviating from the tolerance stored in the RAM 28 (refer to FIG. 3, steps S4 and S6).

The label feed ending means is a means for stopping the feeding of the label sheet 5 when the label failure detection means has detected the detection timing of the label 4 deviating from the tolerance (refer to FIG. 3, Steps S7 and S9). The tag feed ending means is a means for stopping the feeding of the tag sheet when the tag failure detection means has detected the detection timing of the tag deviating from the tolerance (refer to FIG. 3, Steps S7 and S9). When the feeding of the label sheet 5 or the tag sheet is stopped, a slowing down and stopping process of the stepping motor 7 is performed.

Figure 4:
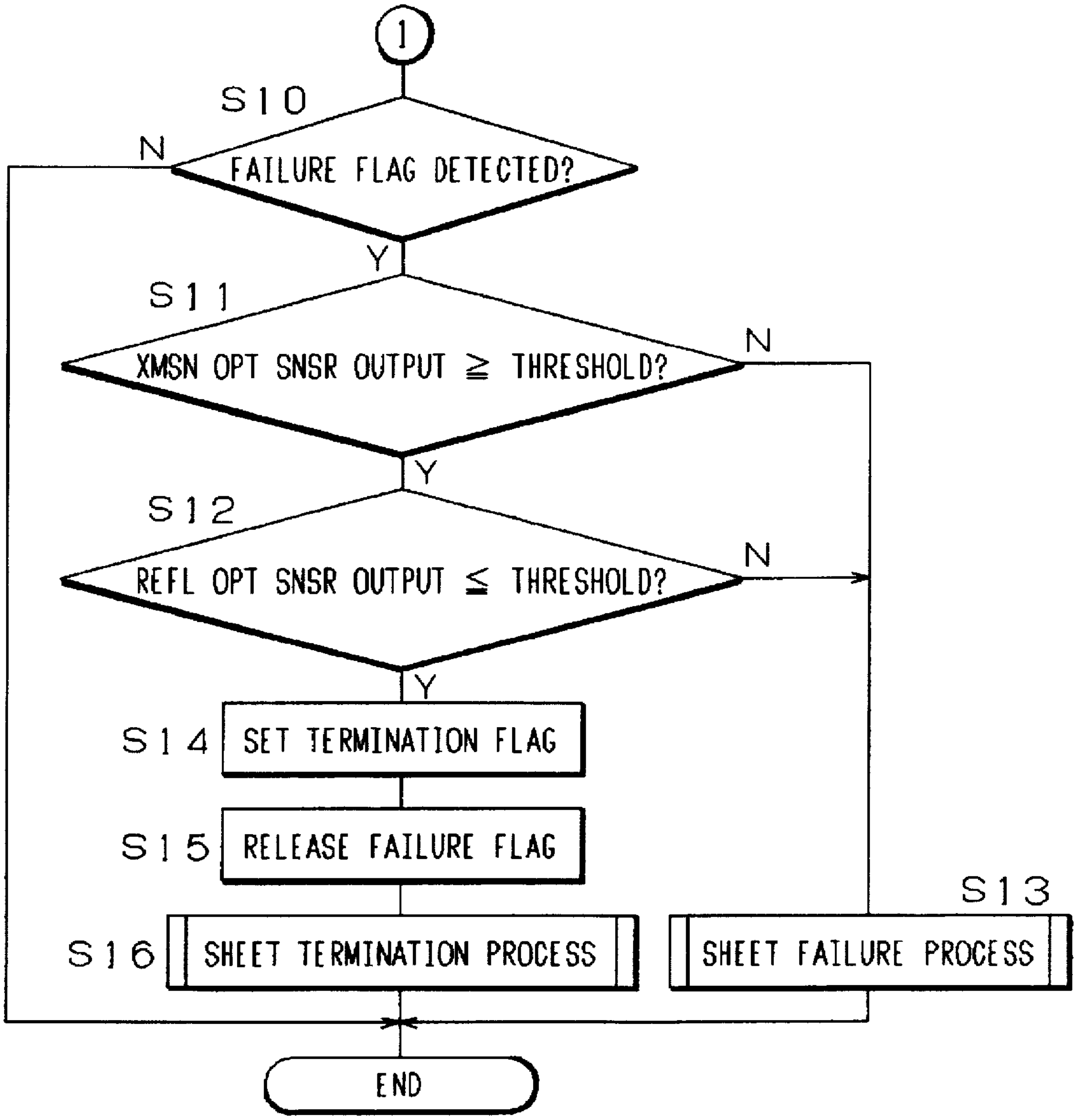
FIG. 4 is a flowchart following FIG. 3.

The label failure determination means is a means for determining whether the label sheet 5 is present or absent by determining whether the output value of the reflection type optical sensor 21 is higher or lower than the threshold value after the feeding of the label sheet 5 has been stopped by the label feed ending means (refer to FIG. 4, step S12). The label failure confirmation means is a means for determining that a failure in the feeding of the label sheet 5 has occurred when existence of the label sheet 5 is confirmed by the label failure determination means (refer to FIG. 4, step S13). The label end detection means is a means for determining that a label sheet 5 is terminated when absence of the label sheet 5 has been confirmed by the label failure determination means (refer to FIG. 4, step S16).

The tag failure determination means is a means for determining whether a tag sheet is present or absent by determining whether the output value of the transmission type optical sensor 20 is higher or lower than the threshold value after the feeding of the tag sheet has been stopped by the tag feed ending means (refer to FIG. 4, step S11). The tag failure confirmation means is a means for determining that a failure in the feeding of the label sheet 5 has occurred when existence of the tag sheet is confirmed by the tag failure determination means (refer to FIG. 4, step S13). The tag end detection means is a means for determining that a tag sheet is terminated when absence of the tag sheet has been confirmed by the tag failure determination means (refer to FIG. 4, step S16).

The processes performed when labels 4 or tags are issued with the above described structure will be described with reference to flowcharts shown in FIG. 3 and FIG. 4. As shown in FIG. 3, a label sheet 5 or a tag sheet loaded in the sheet feeding apparatus 1 is fed a distance corresponding to one step of the stepping motor 7 and, then, the thermal head 13 is driven correspondingly to the one step and, thereby, image printing of one line is carried out (step S2).

In step S3, it is determined whether a failure flag is set in the flag region of the RAM 24. Since the failure flag is set in step S8 described below, the state detected at the first detection is that where the failure flag is not set. Then, the flow advances to step S4. In step S4, it is determined whether the detection timing of the label 4 or the marking is over the upper limit of the tolerance. The determination is made by comparing the cumulative number of steps of the stepping motor 7 for one piece of the label 4 or the tag with the upper limit of the tolerance of the timing for detecting the label 4 or the marking of the tag.

When the detection timing of the label 4 or the marking is determined to be within the tolerance in step S4, it is determined whether presence of the label 4 or the marking of the tag is detected in step S5. Namely, when the output value of the transmission type optical sensor 20 is low, it is determined that the label 4 is present and, when the output of the reflection type optical sensor 21 is low, it is determined that the marking of the tag is present. At this time, the output value of the transmission type optical sensor 20, as shown in FIG. 5(A), is high at the portion of the backing paper 3 and low at the portion of the label 4, and, when the sheet is the tag sheet, the output value is low whether at the portion of the marking or not. The output value of the reflection type optical sensor 21, as shown in FIG. 5(B), is low at the portion of the marking on the tag sheet and high at the portion other than the marking, and, when the sheet is the label sheet 5, the output value is high whether at the portion of the backing paper 3 or at the portion of the label 4. Accordingly, no matter whether it is a label sheet 5 or a tag sheet that is loaded in the sheet feeding apparatus 1, the determination in step S5 can be made from the output values of the transmission type optical sensor 20 and the reflection type optical sensor 21.

When a label 4 or the marking of a tag has been detected in step S5, it is determined in step S6 whether the detection timing of the label 4 or the marking is under the lower limit of the tolerance. The determination is made by comparing the cumulative number of steps of the stepping motor 7 for one piece of the label 4 or the tag with the lower limit of the tolerance of the timing for detecting the label 4 or the marking of the tag. When the detection timing of the label 4 or the marking is determined to be within the tolerance in step S6, then step S7 follows.

In step S7, it is determined whether the stepping motor 7 is to be slowed down and stopped. The stepping motor 7 is slowed down in the following three cases:

(1) When normal printing has been completed;

(2) When the detection timing of the label 4 or the marking has been determined to be over the upper limit of the tolerance in step S4; and (3) When the detection timing of the label 4 or the marking has been determined to be under the lower limit of the tolerance in step S6 although the position of the label 4 or the marking of the tag was detected in step S5. In the case not corresponding to any of the above cases, the procedure from step S1 is repeated and printing is continued to be made on the label 4 or the tag.

In the case where the condition corresponds to some of (1)–(3) above, a slow down process of the stepping motor 7 is performed in step S7. At this time, in the case of (2) and (3) above, the failure flag is set in the flag region of the RAM 24 (step S8) before step S7 is executed. The slow down process is completed when the stepping motor 7 has been driven by a predetermined number of steps (step S9). Thus, the label sheet 5 or the tag sheet is stopped.

Processes following step S9 will be described with reference to FIG. 4. When the slow down process is completed, it is determined whether the failure flag is set in the flag region of the RAM 24 (step S10). Since the failure flag is not set in the case (1) above, i.e., when normal printing has been completed, the printing and issuing process of the label 4 or the tag is ended. In this case, although it is not described in the flowchart of FIG. 4, the completion of the normal printing is notified for example by such outputs as blinking of the pilot lamp 27 and sounding of the buzzer 28, or a message command informing the completion of the normal printing is sent to the host computer and, thereafter, the processing operation is ended. On the other hand, in case of (2) or (3) above, i.e., when the failure flag is detected to be set in step S10, the output value of the transmission type optical sensor 20 is compared with its threshold value (step S11) and the output value of the reflection type optical sensor 21 is compared with its threshold value (step 12).

When either of the fact that the output value of the transmission type optical sensor 20 is higher than the threshold value and the fact that the output value of the reflection type optical sensor 21 is lower than the threshold value is not confirmed, it is considered that such a failure as a jam of the label sheet 5 or the tag sheet or peeling off of the label 4 has occurred, and, accordingly, a sheet failure process is performed (step S13) and the procedure is ended. The sheet failure process is such a process, for example, as to notify of the sheet failure by such outputs as blinking of the pilot lamp 27 and a produced sound by the buzzer 28 and to send a message command about the sheet failure to the host computer.

When both of the fact that output value of the transmission type optical sensor 20 is higher than the threshold value and the fact that the output value of the reflection type optical sensor 21 is lower than the threshold value are confirmed, it is considered that the label sheet 5 or the tag sheet has been terminated and, therefore, a termination flag is set and the failure flag is releases and, then, a sheet termination process is performed (steps S14–S16) and the procedure is ended. The sheet termination process is such a process, for example, as to notify of the sheet termination by such outputs as blinking of the pilot lamp 27 and sounding of the buzzer 28 and to send a message command about the sheet termination to the host computer.

As described above according to the flowcharts shown in FIG. 3 and FIG. 4, when a failure of the label sheet 5 is detected by the transmission type optical sensor 20 while a printing operation is being performed (in the case (1) or (2) above), whether the failure is due to a failure in the sheet or it is due to the termination of the sheet can be confirmed by the output value of the reflection type optical sensor 21. Therefore, the termination of the label sheet 5 is not erroneously detected as a failure in the sheet. Likewise, when a failure of a tag sheet is detected by the reflection type optical sensor 21 while a printing operation is being performed (in the case (1) or (2) above), whether the failure is due to a failure in the sheet or it is due to the termination of the sheet can be confirmed by the output value of the transmission type optical sensor 20. Therefore, the termination of the tag sheet is not erroneously detected as a failure in the sheet.

Further, as described above, after a failure has been detected by one of the transmission type optical sensor 20 and the reflection type optical sensor 21, the slowdown process is carried out such that the label sheet 5 or the tag sheet is slightly fed forward before whether the failure is due to a failure in the sheet or it is due to the end of the sheet is confirmed by the other of the optical sensors 20 and 21. Accordingly, very high accuracy can be obtained in detecting the termination of the sheet.

In addition, such transmission type optical sensor 20 and reflection type optical sensor 21 are installed on conventional sheet feeding apparatuses 1 for detecting the position of a label 4 or a tag. Therefore, it is not necessary to add any dedicated optical sensor for performing the processes in step S11 and step S12 and, thus, the accuracy in detecting the termination of a sheet can be improved with the use of a simple structure.

The present embodiment is just an example of embodiment of the invention and the present invention is not limited by the content of the embodiment. The scope of the present invention is not to be understood to be as narrow as the scope of the embodiment. For example, while an example in which the failure detection means, failure determination means, and termination detection means are provided for each of the label sheet and the tag sheet has been described in the embodiment, such a structure may be possible in which these means are provided only for the label sheet or for the tag sheet. Although a case in which the sheet feeding apparatus 1 is provided as a portion of a label printer 2 has been exemplified in the embodiment, the apparatus can also be applied for example to a label issuing apparatus (not shown) which suitably cuts a label sheet or a tag sheet while it is continuously fed. Further, although the case where the tolerance of the detection timing of the label 4 or the marking on a tag sheet is set by the number of drive pulses of the stepping motor 7 of the sheet feeding mechanism 6 has been exemplified in the embodiment, the invention is not limited to such structure. For example, the tolerance of such detection timing may be set by the operating time of the sheet feeding mechanism 6. As another method, a rotary encoder formed with a disk, which has slits formed therein at regular intervals and rotates in synchronism with the platen roller 9, and adapted such that the slits are detected with an optical sensor may be provided, and the tolerance of the detection timing may be set by the output value of the rotary encoder.

INDUSTRIAL APPLICATION

As described above, the sheet feeding apparatus according to the invention is suitable for use in a printer and, more particularly, in a printer for printing a predetermined image on a label or a tag.

I claim:

1. A sheet feeding apparatus comprising:

a sheet feeding mechanism having a sheet, which is either a label sheet, which is formed of backing paper constituted of continuous paper and a number of labels stuck thereon at regular intervals, or a tag sheet, which is constituted of continuous paper and forms tags serially connected with each other having markings individually formed thereon, selectively set thereon and feeding said sheet along a predetermined path;

label position detection means disposed along said path having a transmission type optical sensor disposed in a position facing a label sheet fed by said sheet feeding mechanism for detecting a position of a label according to an output value of said transmission type optical sensor compared to a predetermined threshold value, which becomes high at the position of the backing paper and becomes low at the position in which the label is stuck;

tag position detection means disposed along said path having a reflection type optical sensor disposed in a position facing a tag sheet fed by said sheet feeding mechanism for detecting a position of a tag according to an output value of said reflection type optical sensor compared to a predetermined threshold value, which becomes low at a position of the marking and becomes high at a position of a space between the markings;

label problem detection means connected to said label position detection means for detecting a label sheet problem when a detection timing of the label by said label position detection means deviates from a predetermined tolerance;

label failure/termination determination means connected to said label problem detection means for determining whether the output value of said reflection type optical sensor is high or low when a label sheet problem is detected by said label problem detection means and determining a label failure if the output value of the reflection type sensor is high and a label termination if the output value of the reflection type sensor is low.

2. A sheet feeding apparatus according to claim 1, wherein said label failure/termination determination means determines whether output value of said reflection type optical sensor is high or low compared to said threshold value.

3. A sheet feeding apparatus according to claim 1, further comprising means for stopping the feeding of the label sheet when said label problem detection means detects a label sheet problem.

4. A sheet feeding apparatus according to claim 3, further comprising means for slightly feeding forward the label sheet when the feeding of the label sheet is to be stopped.

5. A sheet feeding apparatus according to claim 1, wherein a stepping motor (7) is used for a drive source of said sheet feeding mechanism and said label problem detection means detects a label sheet problem according to the number of steps of said stepping motor.

6. A sheet feeding apparatus according to claim 1, wherein said label problem detection means detects a label sheet problem according to the time required for feeding the label sheet.

7. A sheet feeding apparatus according to claim 1, further comprising means for indicating, when a termination of a label sheet is detected by said label failure/termination determination means.

8. A sheet feeding apparatus according to claim 1, further comprising means for indicating, when a termination of a label sheet is detected by said label failure/termination determination means.

9. A sheet feeding apparatus comprising:

a sheet feeding mechanism having a sheet, which is either a label sheet, which is formed of backing paper constituted of continuous paper and a number of labels stuck thereon at regular intervals, or a tag sheet, which is constituted of continuous paper and forms tags serially connected with each other having markings individually formed thereon, selectively set thereon and feeding said sheet along a predetermined path;

label position detection means disposed along said path having a transmission type optical sensor disposed in a position facing a label sheet fed by said sheet feeding mechanism for detecting a position of a label according to an output value of said transmission type optical sensor compared to a predetermined threshold value, which becomes high at the position of the backing paper and becomes low at the position in which the label is stuck;

tag position detection means disposed along said path having a reflection type optical sensor disposed in a position facing a tag sheet fed by said sheet feeding mechanism for detecting a position of a tag according to an output value of said reflection type optical sensor compared to a predetermined threshold value, which becomes low at a position of the marking and becomes high at a position of a space between the markings;

tag problem detection means connected to said tag position detection means for detecting a tag sheet problem when a detection timing of the marking by said tag position detection means deviates from a predetermined tolerance;

tag failure/termination determination means connected to said tag problem detection means for determining whether the output value of said transmission type optical sensor is high or low when a tag sheet problem is detected by said tag problem detection means and detecting a tag failure if the output value of the transmission type sensor is low and determining a tag termination if the output value of the transmission type sensor is high.

10. A sheet feeding apparatus according to claim 9, wherein said tag failure/termination determination means determines whether output value of said transmission type sensor is high or low compared to said threshold value.

11. A sheet feeding apparatus according to claim 9, further comprising means for stopping the feeding of the label sheet when said tag problem detection means detects a label sheet problem.

12. A sheet feeding apparatus according to claim 11, further comprising means for slightly feeding forward the label sheet when the feeding of the label sheet is to be stopped.

13. A sheet feeding apparatus according to claim 9, wherein a stepping motor (7) is used for a drive source of said sheet feeding mechanism and said tag problem detection means detects a tag sheet problem according to the number of steps of said stepping motor.

14. A sheet feeding apparatus according to claim 9, wherein said tag problem detection means detects a tag sheet problem according to the time required for feeding the tag sheet.

15. A sheet feeding apparatus according to claim 9, further comprising means for indicating, when a termination of a tag sheet is detected by the tag failure/termination determination means.

16. A sheet feeding apparatus according to claim 9, further comprising means for indicating, when a termination of a tag sheet is detected by the tag failure/termination determination means.

17. A sheet feeding apparatus comprising:

a sheet feeding mechanism having a sheet, which is either a label sheet, which is formed of backing paper constituted of continuous paper and a number of labels stuck thereon at regular intervals, or a tag sheet, which is constituted of continuous paper and forms tags serially connected with each other having markings individually formed thereon, selectively set thereon and feeding said sheet along a predetermined path;

label position detection means disposed along said path having a reflection type optical sensor disposed in a position facing a label sheet fed by said sheet feeding mechanism for detecting a position of a label according to an output value of said transmission type optical sensor compared to a predetermined threshold value, which becomes high at the position of the backing paper and becomes low at the position in which the label is stuck;

tag position detection means disposed along said path having a reflection type optical sensor disposed in a position facing a tag sheet fed by said sheet feeding mechanism for detecting a position of a tag according to an output value of said reflection type optical sensor compared to a predetermined threshold value, which becomes low at a position of the marking and becomes high at a position of a space between the markings;

problem detection means connected to said label position detection means and said tag position detection means for detecting a sheet problem when a detection timing by said label position detection means or tag position detection means deviates from a predetermined tolerance;

failure/termination determination means connected to said problem detection means for determining whether the output value of said transmission type optical sensor and said reflection type optical sensor is high or low when a sheet problem is detected by said problem detection means and determining a sheet termination if the output value of the transmission type optical sensor is high and the output value of a reflection type optical sensor is low, and determining a sheet failure otherwise.

* * * * *